United States Patent
Hunter et al.

[15] 3,661,059
[45] May 9, 1972

[54] FLUID OPERATED STEPPING MOTOR

[72] Inventors: John M. Hunter, Granby; Raymond V. Thompson, Simsbury, both of Conn.

[73] Assignee: Chandler Evans Inc., West Hartford, Conn.

[22] Filed: Feb. 19, 1970

[21] Appl. No.: 12,585

[52] U.S. Cl. ..................................91/499, 91/192, 91/193, 91/194
[51] Int. Cl. ........................................F01l 15/00, F01b 3/00
[58] Field of Search...................91/40, 183, 170, 189, 192, 91/193, 194, 498, 499, 502, 476

[56] References Cited

UNITED STATES PATENTS

| | | | |
|---|---|---|---|
| 3,424,059 | 1/1969 | Conner et al. | 91/183 |
| 3,237,641 | 3/1966 | Audemar | 91/40 |
| 2,882,831 | 4/1959 | Dannevig | 91/498 |
| 1,948,526 | 2/1934 | Liles | 91/193 |
| 3,075,504 | 1/1963 | Vogel | 91/491 |
| 1,939,887 | 12/1933 | Ferris et al. | 91/193 |
| 1,622,986 | 3/1927 | Weingartner | 91/502 |

FOREIGN PATENTS OR APPLICATIONS

| | | | |
|---|---|---|---|
| 542,789 | 5/1922 | France | 91/502 |
| 592,271 | 1/1934 | Germany | 91/499 |

*Primary Examiner*—William L. Freeh
*Attorney*—Radford W. Luther

[57] ABSTRACT

A fluid operated stepping motor has a rotor with a plurality of ramps. A plurality of pistons are positioned in the stator of the motor on opposite sides of the rotor in alignment with the rotor axis to rotate the rotor. A logic circuit is adapted to accept a digital signal to rotate the rotor a discrete amount in either a clockwise or counterclockwise direction. The logic circuit actuates only certain pistons which stroke to rotate the rotor. The position of the rotor determines which of the pistons will be stroked upon receipt of the next signal by the logic circuit.

11 Claims, 6 Drawing Figures

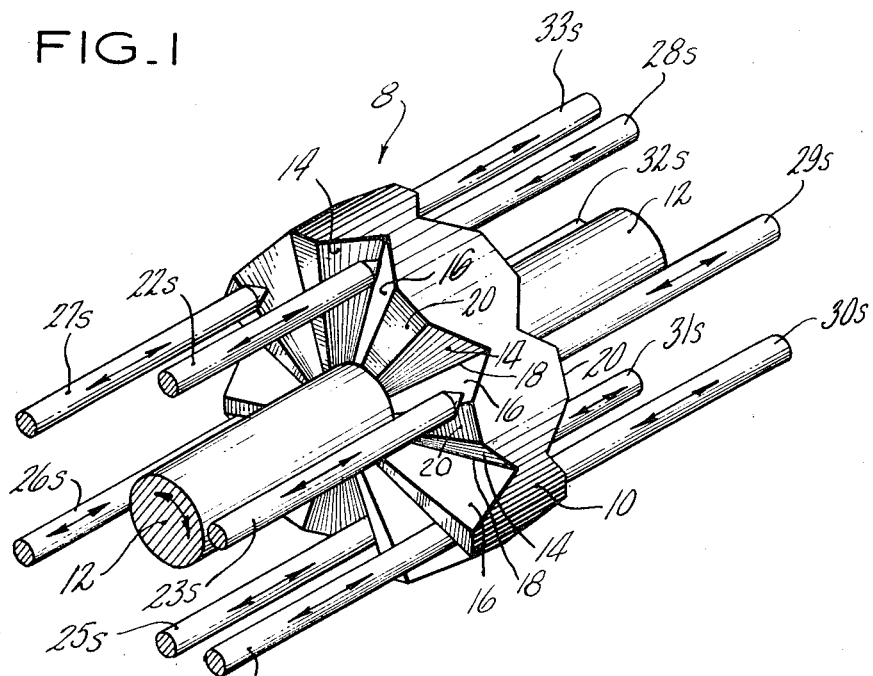
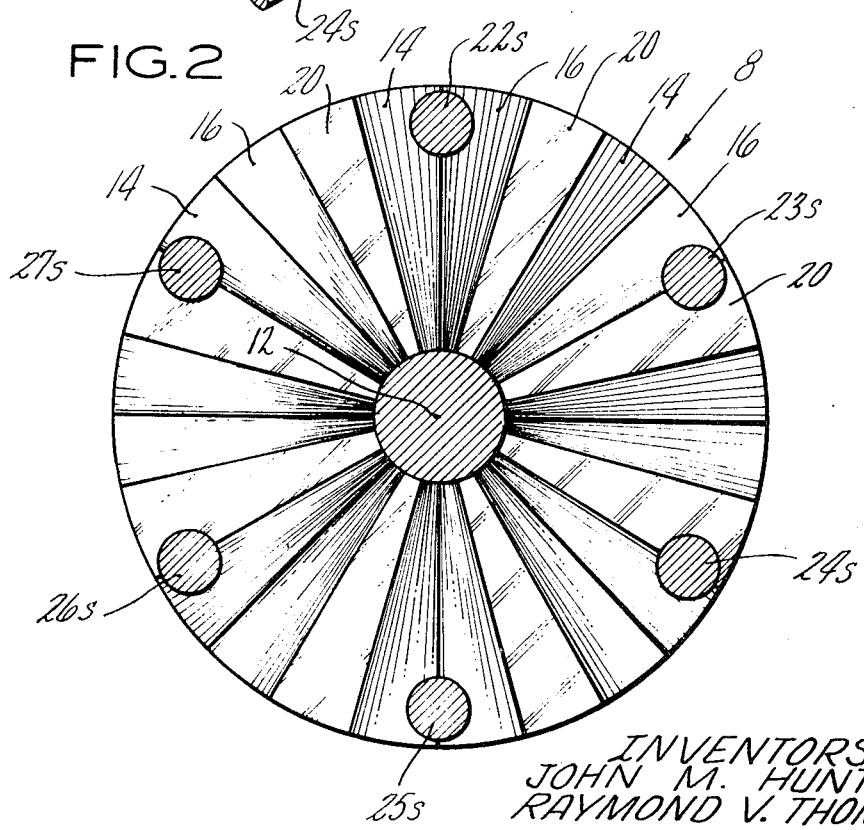

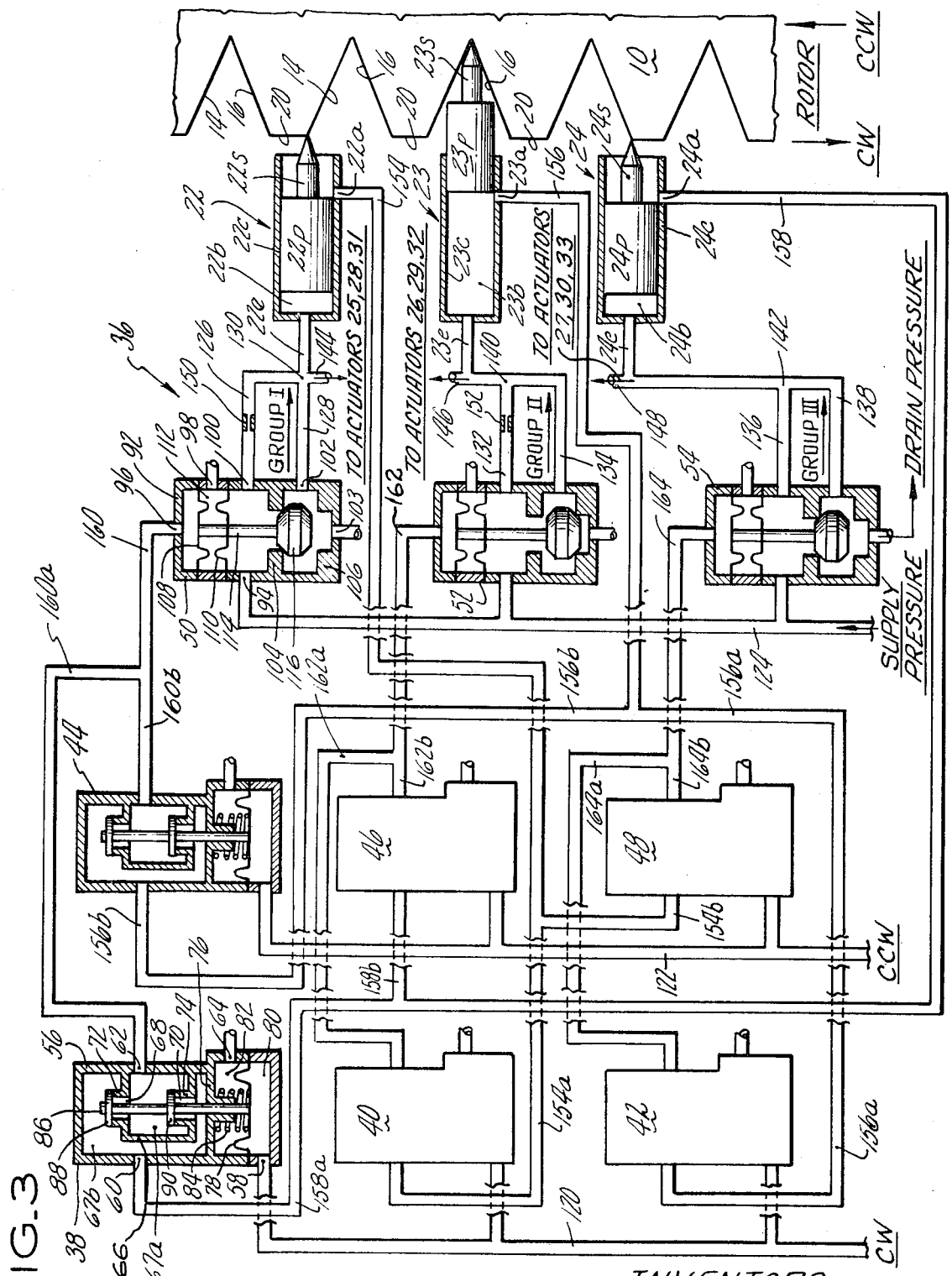

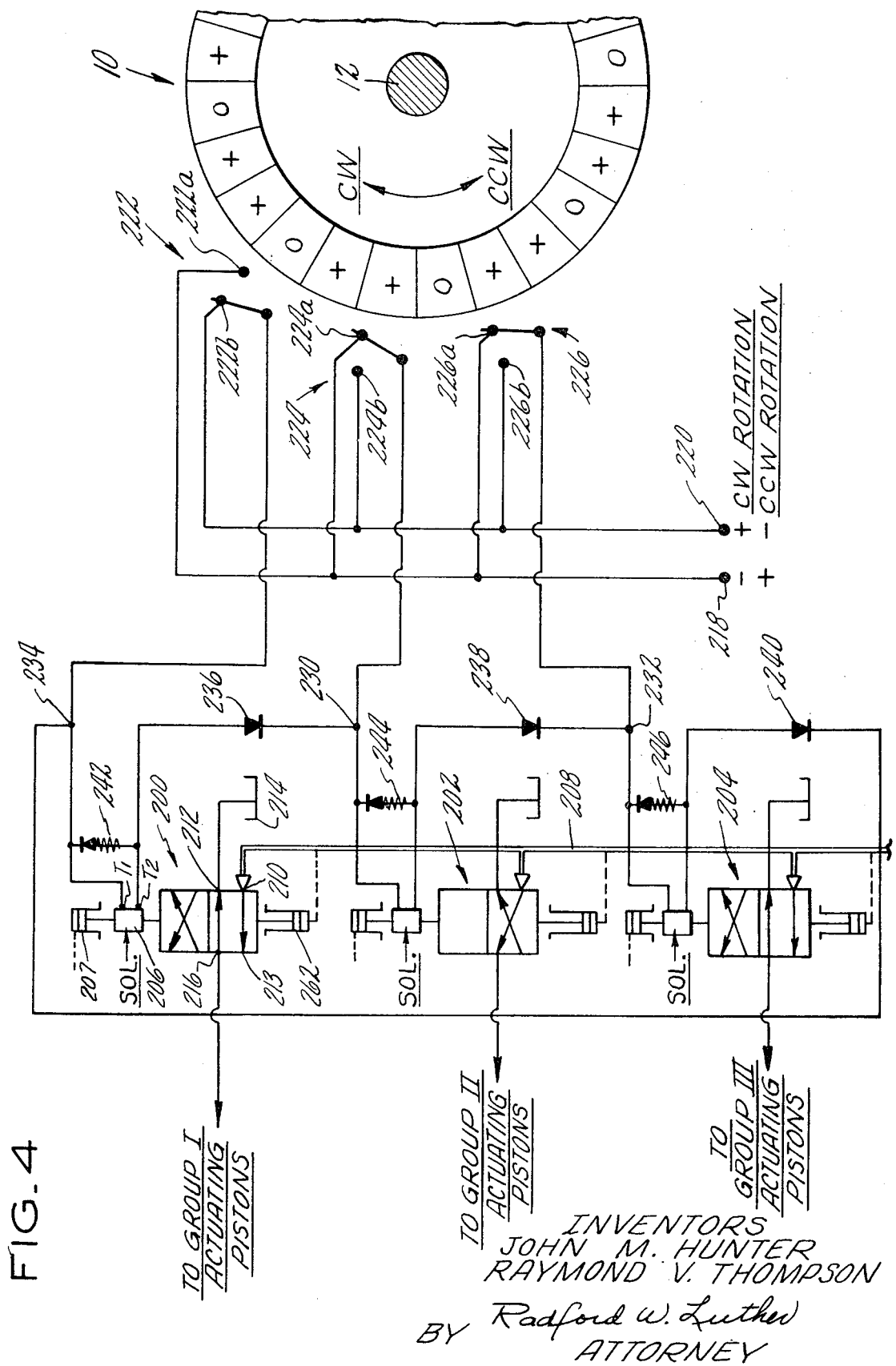

3,661,059

FLUID OPERATED STEPPING MOTOR

BACKGROUND OF THE INVENTION

The invention relates generally to stepping motors and more particularly to fluid operated stepping motors.

The majority of commercially available stepping motors are of the electrical permanent magnet or variable reluctance type. Although these motors are capable of high stepping rates and fine resolution, their output power capability is limited. Since the power available from a stepping motor is largely determinative of its performance with respect to starting and stopping loads without unacceptable error a large output power capability is often desirable.

One of the most prominent limitations that confronts systems designers is the decrease in torque with increasing speed. Obviously, suitable gearing will provide torque gains, but this, of course, will result in reduced speed. Therefore, for applications such as numerically controlled machine tools and automatic welding equipment, utilization of an electrical stepping motor usually necessitates some form of power or torque amplification, thereby increasing the complexity of the stepping motor. It should be noted, however, that hydraulic amplification is invariably the form selected because it promotes high stiffness and fast response and is convenient with respect to flexibility of design.

Various schemes have been devised to decrease the torque requirements of the motor and thus overcome the problem mentioned above. One of these methods involves permitting the motor to accelerate over the first few steps and decelerate over the last few steps. This method, however, is basically limited to pre-programmed operations wherein the stop point can be accurately anticipated.

Also, many prior art stepping motors do not unite high torque, bi-directional operation and positive locking capabilities. These features are particularly desirable in applications such as control surface actuation and leading edge controls on high performance aircraft.

SUMMARY OF THE INVENTION

The invention provides a stepping motor with a logic system which accepts a digital signal to accurately position the rotor of the stepping motor. The rotor of the stepping motor is positioned by a plurality of actuating piston assemblies which generate a torque on the rotor and further provide positive step locking. Only certain pistons stroke in response to each digital signal, and the other pistons subsequently stroke in response to succeeding signals. The rotor of the invention comprises a plurality of ramps on both sides thereof, on which output members of the piston assemblies are adapted to slide, and thereby rotate the rotor by force transfer.

A stepping motor according to the invention is advantageous in that it is capable of producing a high output torque and is operable in a bi-directional manner after completion of any step. Further, this stepping motor concept facilitates integral packaging and permits a design with a minimum number of external connections.

A primary object of the invention is to provide a stepping motor capable of delivering a high output torque in a bi-directional manner.

Another object is to provide a stepping motor which features a positive lock in the discrete positions thereof.

A further object is to provide a stepping motor in which the output member thereof is capable of being accurately and discretely positioned.

Other objects, advantages and novel features of the invention will become apparent from the following detailed description when considered in conjunction with the accompanying drawings.

BRIEF DESCRIPTION OF THE DRAWINGS

FIG. 1 is a perspective view, partly in section, of an output device according to the invention.

FIG. 2 is a front elevational view, partly in section, of the device of FIG. 1.

FIG. 3 is a schematic view of a hydropneumatic control circuit for the device of FIG. 1.

FIG. 4 is a partial schematic view of a hydroelectric control circuit for the device of FIG. 1.

DETAILED DESCRIPTION OF PREFERRED EMBODIMENTS

Figure 5:
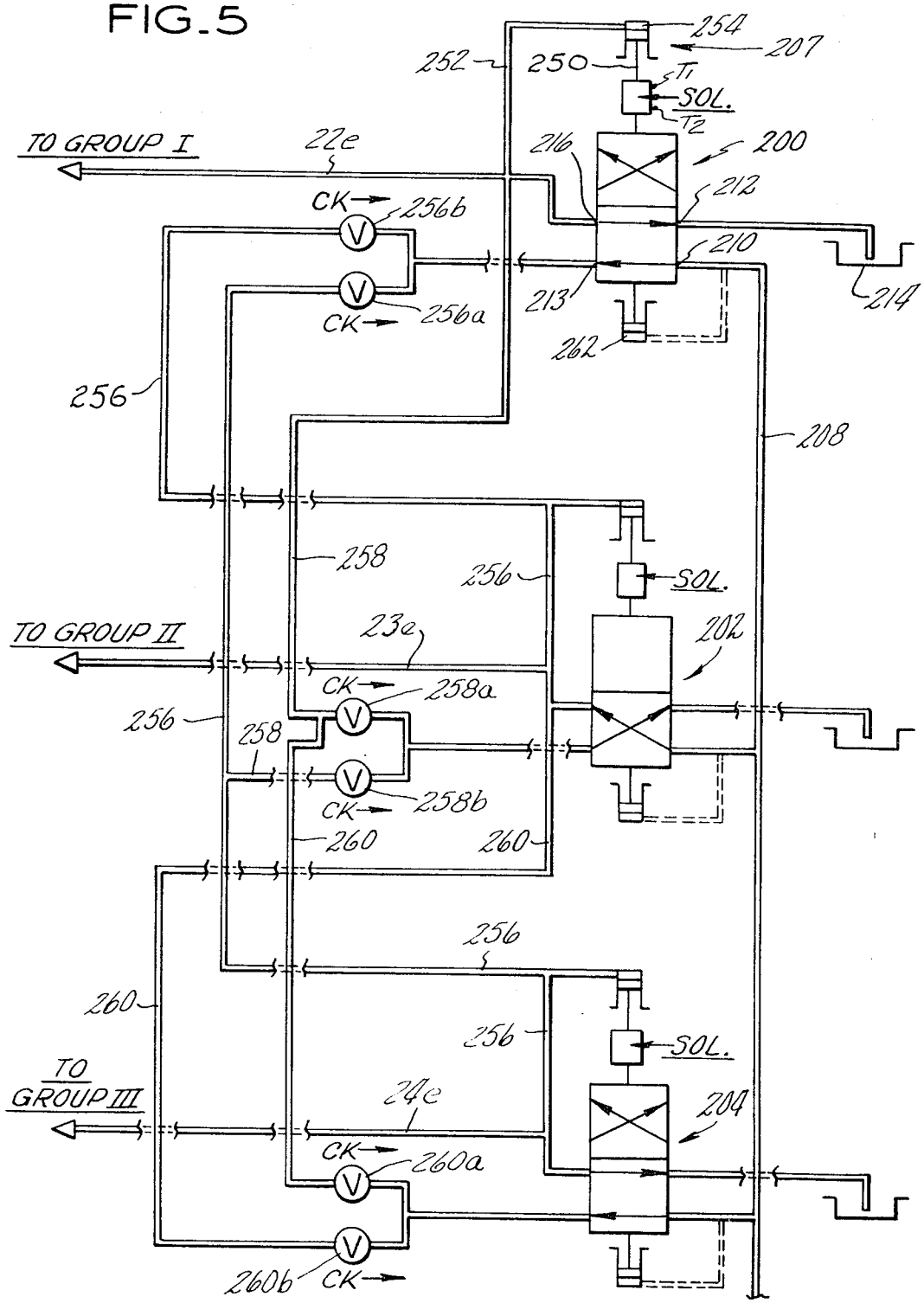
FIG. 5 is a schematic view of a hydraulic locking circuit for the hydroelectric control circuit of FIG. 4.

Turning now to the drawings, wherein like numerals are used throughout to designate like elements, FIGS. 1 and 2 show an output device, generally indicated at 10, of a stepping motor according to the invention. Output device 8 comprises a rotor 10 having a cyclic edge profile on both sides thereof fixedly mounted upon an output member 12. Rotor 10 has a plurality of ramps 14 and 16 machined on each side thereof. The ramps respectively converge along lines 18 so as to divide the rotor into an equal number of parts. On the sides of the rotor, planar surfaces 20 are machined between ramps 14 and 16. Each ramp and surface occupies an angle approximately equal to the desired step size. The angle occupied by each surface 20 is slightly less than the step size and the angle occupied by each ramp is slightly greater than the step size for reasons explained hereinafter.

As best shown in FIG. 3, rotor 10 is driven by a plurality of actuators 22, 23, 24, 25, 26, 27, 28, 29, 30, 31, 32, and 33, wherein only three of the actuators 22, 23, and 24 are shown. The actuators 22–33 respectively include cylinders 22c, 23c, 24c, etc., pistons 22p, 23p, 24p, etc., slideably mounted therein, and pointed output rods 22s, 23s, 24s, etc., which are securely attached to the pistons and are arranged parallel to axis of the rotor. Three of the actuators 22, 23, and 24 are master actuators and have sequencing ports 22a, 23a, and 24a in the respective cylinders thereof which function as a discrete feedback control for the logic circuit as is explained hereinafter. At the closed or left ends of the cylinders, respective pressure lines 22e, 23e, 24e, etc. are connected to communicate with the respective chambers 22b, 23b, 24b, etc., defined between the cylinders and pistons. These lines are adapted to transmit the fluid which actuates the pistons. It will be noted from FIG. 3, that three groups of actuators, designated I, II and III, control the rotation of the rotor 10, each group including one master actuator. All of the actuators of a particular group stroke in unison when pressure is directed thereto. It can be observed from FIGS. 1 and 2 that two actuators of group I are spaced at 180° intervals on one side of the rotor while the other two actuators of group I are similarly spaced at 180° intervals on the other side of the rotor and lie in respective axial alignment with the first two actuators. Each actuator is orientated in the stator such that it is parallel to axis of the rotor. Therefore, the actuators of group I are generally disposed in a common plane. The actuator group arrangement ensures axial balance of the rotor during actuation. The actuators of groups II and III are arranged in a similar fashion, but respectively lie in planes spaced 60° and 120° from the plane of the group I actuators.

In FIG. 3 a logic circuit generally designated at 36 is adapted to selectively control the actuators by directing high or low hydraulic pressure to the actuator groups in accordance with a pneumatic digital input signal and feedback signals from the sequencing ports. The logic circuit comprises six identical pilot valves 38, 40, 42, 44, 46 and 48, and three identical power valves 50, 52 and 54. Two pilot valves (a clockwise valve and a counterclockwise valve) and one power valve are associated with each actuator group.

Each pilot valve has a housing 56 having a signal port 58, an inlet pressure port 60, an outlet port 62, and a vent port 64. An enclosure 66 is secured to the housing 56 so as to define an outlet pressure chamber 67a which communicates with outlet port 62, and an inlet pressure chamber 67b which communicates with inlet port 60. Enclosure 66 has circular openings 68 and 70 respectively formed in the top and bottom walls thereof. Annular valve seats 72 and 74 respectively surround openings 68 and 70. A dividing wall 76, having an opening passing therethrough, extends across the lower portion of the housing and is fixedly secured thereto. A diaphragm 78 is sealingly attached to the housing 56 below wall 76 to thereby define a signal chamber 80 and a vent chamber 82 which respectively communicate with signal port 58 and vent port 64. A compression spring 84 is interposed between wall 76 and diaphragm 78 to spring bias the diaphragm in a downward sense. A spool 86, having spaced lands 88 and 90 thereon, is securely fastened to diaphragm 78 and axially extends through openings 68 and 70 and the opening in wall 76. In the absence of a pneumatic pressure signal to port 58, spool 86 occupies the illustrated position in which the lands 88 and 90 are spring biased to engaging positions with respective seats 72 and 74, thereby preventing fluid communication between chambers 67b and 67a.

When a pneumatic signal is delivered to signal port 58, a pressure rise occurs in chamber 80 which results in upward movement of diaphragm 78. This upward motion is transmitted to spool 86 and thus to the lands 88 and 90, thereby causing them to unseat and establishing communication between chambers 67a and 67b. Conversely, cessation of this signal results in downward movement of diaphragm 78 because of the influence of the spring force and area imbalance, thereby causing the lands to seat and discontinuing fluid communication between chambers 67a and 67b.

Power valves 50, 52 and 54 each comprise a housing 92 which includes a supply port 94, signal port 96, vent port 98, pressure outlet port 100, actuator control port 102, and drain port 103. Housing 92 also includes annular abutments 104 and 106 which serve as valve seats. Two spaced diaphragms 108 and 110 are sealingly affixed to the sides of housing 92 to define a vent chamber 112 therebetween which lies in communication with vent port 98. A spool 114 extends through the central portion of diaphragm 110 and is sealingly secured thereto. The upper extremity of spool 114 is attached to diaphragm 108. A land 116 formed on the lower portion of spool 114 is adapted to move between an upper position in which it seals off the passage formed by annular abutment 104, and a lower position in which it seals off the passage formed by annular abutment 106.

In response to an appropriate hydraulic pressure signal at port 96, land 116 is driven downwardly from the illustrated position in power valve 50 to a position which corresponds with the illustrated position of power valve 52. It will be noted that when land 116 is in the position shown in power valve 52, actuator control port 102 communicates with supply port 94 via the passage defined by annular abutment 104, while in the position shown in power valve 50, actuator control port 102 communicates with drain port 103. Pressure outlet port 100 is in communication with supply port 94 irrespective of land 116's position. The diaphragms used in the pilot and power valves contribute to fast response, compact design, dirt insensitivity and low leakage.

Before engaging in a detailed discussion of the logic circuit it would be profitable to note the various pressures to which the system of FIG. 3 is exposed. Clockwise signal conduit 120 and counterclockwise signal conduit 122, which fluidly communicate with chambers 80 in the clockwise and counterclockwise pilot valves, are in communication with a source of pneumatic pressure during application of respective clockwise and counterclockwise control signals. Supply ports 94 of the power valves are in constant communication with a source of hydraulic supply pressure via supply conduit 124. Drain ports 103 of the power valves are in constant communication with a source of hydraulic drain pressure (tank pressure). The sides of the rotor 10 and the mouth of each cylinder (22c – 33c) are also exposed to static hydraulic drain pressure.

The conduits, which interconnect the pilot valves and power valves with the master actuators 22 – 24, are arranged so that the actuators receive hydraulic pulses which comport with stepped motion of rotor 10. Two branch conduits 126 and 128 are respectively connected to pressure outlet port 100 and actuator control port 102 and joined to pressure line 22e at 130. Similarly, branch conduits 132, 134 and 136, 138 are respectively connected to the corresponding ports in power valves 52 and 54. Branch conduits 132, 134 and 136, 138 join with the respective pressure lines 23e and 24e at junctures 140 and 142 respectively. Ducts 144, 146 and 148 communicate with respective lines 22e, 23e and 24e to transmit pressures therein to the other actuators of each group.

Unequally sized orifices 150 and 152 are respectively mounted within the branch conduits 126 and 132 to provide a bias torque on the rotor. The orifices 150 and 152 perform an ancillary function in that they merely assure the subsequent proper positioning of the actuators in the event that supply pressure is depleted, through design or inadvertence, and any of the following occur alone or in concert:

A. The column of fluid which holds the power valve in the open position leaks away through the seats in the pilot associated valves, thereby causing the power valve to return to the closed position;

B. The rotor is displaced to an arbitrary position by an external force.

The inclusion of the orifices of different sizes resolves these undesirable contingencies by providing a bias torque upon return of the supply pressure which drives the actuators into a sequencing configuration, as exemplified by FIG. 3.

To illustrate this particular design feature assume, for example, that orifice 150 is smaller than orifice 152 and that the power valves all occupy closed positions. When the supply pressure returns, chamber 24b will receive the highest pressure and chamber 22b will receive the lowest pressure, while chamber 23b will receive an intermediate pressure. Therefore, the group of actuators which is associated with the higher pressure and whose shafts abut a ramp will supply the bias torque after the supply pressure is reestablished.

Sequencing conduits 154, 156 and 158 are respectively connected to the cylinders 22c, 23c and 24c at ports 22a, 23a and 24a to transmit feedback signals, representative of discrete rotor positions, to the logic circuit. These sequencing conduits respectively bifurcate into segments (154a, 154b), (156a, 156b) and (158a, 158b). The segments 154a, 156a and 158a are in respective communication with the inlet pressure ports 60 of the clockwise pilot valves 40, 42 and 38 and the segments 154b, 156b and 158b are in respective communication with the inlet pressure ports 60 of the counterclockwise pilot valves 48, 44 and 46. It will be noted from FIG. 3 that sequencing conduits 154, 156 and 158 communicate with static drain pressure when the respective shafts of their associated actuators are adjacent the surfaces 20 and with supply pressure behind the pistons when the respective shafts abut lines 18 on rotor 10. Thus, in the illustrated configuration of FIG. 3, the inlet pressure ports 60 (and hence chambers 67b) of pilot valves 38, 40, 46 and 48 are in communication with drain pressure, while the inlet pressure ports of pilot valves 42 and 44 are in communication with supply pressure.

Power valve signal pressure conduits 160, 162 and 164 fiburcate into segments (160a, 160b), (7/8a, 162b) and (164a, 164b) to fluidly interconnect the outlet ports of the pilot valves with the signal ports 96 of the power valves. FIG. 3 reveals that outlet ports 62 of pilot valves (38, 44), (40, 46), and (42, 48) respectively communicate with the signal ports 96 of power valves 50, 52 and 54, thereby transmitting the pressure in chambers 67a to the associated signal ports. If a signal port is in communication with a high supply pressure in chamber 67a, its associated spool is disposed in the position shown for power valve 52. Conversely, if a signal port is in communication with a low (drain) pressure in chamber 67a its associated spool is in the position shown in either power valve 50 or 54.

As previously set forth, each surface 20 occupies an angle which is less than that occupied by each ramp. The amount by which the angle occupied by each ramp exceeds the step size is equal to half of the amount by which step size exceeds the angle occupied by each surface. The underlying reason for this rotor geometry is that it is desirable to have the actuator rods overlie the ramps prior to the commencement of a power stroke to insure that the pointed ends of the rods do not bind on the intersections of the surfaces 20 and the ramps at the inception of the stroke.

Assuming that it is desired to move the rotor 10 through one step in a clockwise manner and that the configuration of the output device 8 of FIG. 1 is as shown in FIG. 3, it is necessary to direct a pneumatic digital pulse of specific magnitude and duration to clockwise signal conduit 120. As explained heretofore, the application of such a pulse results in communication between chambers 67a and 67b by virtue of the unseating of lands 88 and 90 of the clockwise pilot valves. It is important to stress that all of the clockwise pilot valves operate in unison during application of a pulse, as is, of course, also the case with the counterclockwise pilot valves. This means that during the application of a clockwise pulse the chambers 67a and 67b of the respective clockwise pilot valves 38, 40 and 42 are in fluid communication.

When a clockwise pulse is applied to the clockwise pilot valves through signal conduit 120, a low (drain) pressure signal is communicated to the signal port 96 of power valve 50 via segment 160a and signal conduit 160 since chamber 67b of pilot valve 38 is in communication with drain pressure via sequencing conduit 158; a low (drain) pressure signal is communicated to the signal port of power valve 52 via segment 162a and signal conduit 162 since chamber 67b of pilot valve 40 is in communication with drain pressure via sequencing conduit 154; and a high (supply) pressure signal is communicated to the signal port of power valve 54 via segment 164a and signal conduit 164 since chamber 67b of pilot valve 42 is in communication with supply pressure via sequencing conduit 156. The effects of such a pulse on the power valves are as follows. The land 116 of power valve 50 remains in its illustrated position and control port 102 continues to communicate with drain pressure via drain port 103; land 116 of power valve 52 moves upwardly from its illustrated position into seating engagement with annular abutment 104, thereby effecting communication between control port 102 and drain port 103; and land 116 of power valve 54 moves downwardly from its illustrated position into seating engagement with annular abutment 106, thereby effecting a communication between control port 102 and supply pressure port 94. Therefore, such a pulse results in a low pressure at the control ports of power valves 50 and 52 and a high pressure at the control port of power valve 54. The pulse produces no changes in the pressures in the actuator chambers 22b, 25b, 28b and 31b (actuator group I), but simultaneously increases the pressures in actuator chambers 24b, 27b, 30b and 33b (actuator group III) and decreases the pressures in actuator chambers 23b, 26b, 29b and 32b (actuator group II). Therefore, shafts 22s, 25s, 28s and 31s respectively move from ramps 14 to ramps 16 across surfaces 20, while shafts 24s, 27s, 30s and 33s stroke into the rotor 10 along respective ramps 16, thereby rotating the rotor in a clockwise manner. During this rotation, as the chambers of the actuators of group II are in communication with a low pressure, the ramps 14 respectively move shafts 23s, 26s, 29s and 32s into the respective cylinders by virtue of the forces imparted thereto. After shafts 24s, 27s, 30s and 33s complete their power strokes, the extremities thereof will abut the respective lines 18, shafts 23s, 26s, 29s and 32s will abut the ramps 14 adjacent the respective intersections of ramps 14 and surfaces 20, and shafts 22s, 25s, 28s and 31s will abut ramps 16 adjacent the respective intersections of ramps 16 and surfaces 20.

In this new position, chambers 67b of respective pilot valves 38 and 46 are in communication with the high (supply) pressure in chamber 24b via sequencing conduit 158, while the chambers 67b of the other pilot valves communicate with drain pressure. The stepping motor is now ready for another signal pulse via either signal conduit 120 or 122.

It will be seen, therefore, that a succeeding clockwise signal pulse will cause shafts 22s, 25s, 28s and 31s to undergo power strokes along respective ramps 16, thereby rotating the rotor 10 and forcing shafts 24s, 27s, 30s and 33s away from the rotor towards their respective cylinders. This pulse will, of course, produce no change in the final positions of shafts 23s, 26s, 29s and 32s.

A cursory examination of FIG. 3 will reveal that for counterclockwise rotation the master pistons stroke towards the rotor in the following sequence: 22, 24, 23, 22, 24, 23; and for clockwise rotation the master pistons stroke in the following sequence: 24, 22, 23, 24, 22, 23, 24.

To recapitulate briefly, the master pistons and their respective associated actuators form three actuator groups. The actuators of one of the groups stroke in unison inwardly to rotate the rotor, while the actuators of one of the other groups retract in unison under the influence of the force exerted upon them by the rotor. During the stroke the actuators of the remaining group remain essentially inactive. For the illustrated arrangement in FIGS. 1–3, each power stroke produces a 15° rotor displacement. The actuator shafts of those actuators which are to initiate a power stroke are partially down their respective ramps, thereby ensuring that full output power will be available at the commencement of actuation.

Sequencing is initiated when a power stroke is completed and a feedback signal (supply pressure behind the power piston) is fed to a clockwise and a counterclockwise pilot valve. Then, either a clockwise or counterclockwise signal is applied to the appropriate pilot valves which results in actuation of a power valve. Pressure communicated from the power valve causes actuators of a group to undergo further power strokes. After the signal to the pilot valve terminates, the power valve, which controls the power stroke, is locked in the open position by a column of hydraulic fluid trapped between the power valve and pilot valve. The trapped fluid, in effect, locks the rotor since the supply pressure keeps the shafts in firm contact with the respective lines 18.

Figure 6:
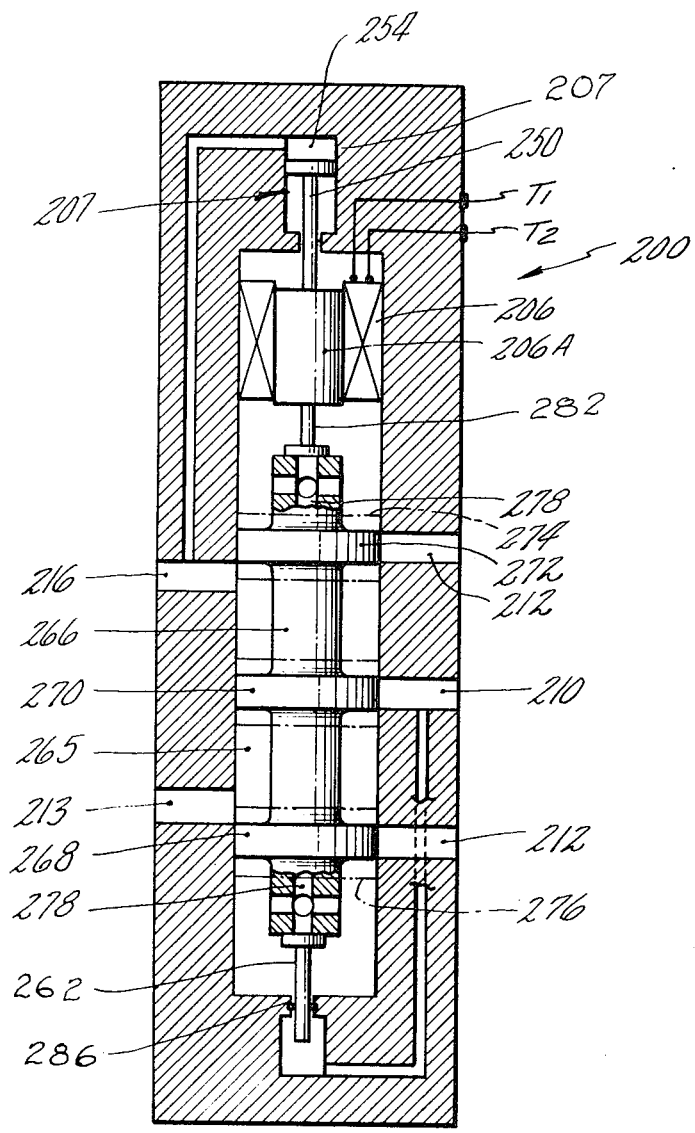
FIG. 6 is a schematic view of a power valve of FIG. 4.

The embodiment shown in FIGS. 4–6 includes a substantially identical rotor and actuator group arrangement shown in FIGS. 1–3 except that the sequencing ports 22a, 23a and 24a are eliminated. The salient differences between the two embodiments are that the embodiment of FIG. 4 makes use of permanent magnets in the rotor, which actuate adjacent switches in the stator in order to furnish proper feedback sequencing, and utilizes solenoids to operate the power valves. In contradistinction to the embodiment of FIG. 4, the embodiment of FIG. 3 makes use of a series of pilot valves and a conduit arrangement to accomplish the same objectives.

Referring now in detail to FIG. 4, the rotor 10 has a plurality of permanent magnets, designed by a "+" sign, mounted around its peripheral edge in groups of two. Two juxtaposed magnets occupy an arc of 30°. The adjacent groups are spaced from one another by arcs equal to 15°. The spaces, designated "0," between the neighboring groups are neutral.

Three power valves 200, 202 and 204 are adapted to deliver pressure to the three groups of actuators I, II and III. Each power valve is operated by a D.C. solenoid 206 having terminals $T_1$ and $T_2$. The power valves 200, 202 and 204 are represented in FIG. 4 by line diagrams using standard hydraulic symbols. As is hereinafter explained, the power valves are hydraulically locked in position by respective pistons 207 after actuation by the solenoids to lock the rotor against displacements.

A supply pressure line 208 communicates with each of the power valves at their respective pressure ports 210. Drain ports 212 are in communication with sources of drain pressure (tank pressure) 214. Control ports 216 communicate with the chambers behind the actuating pistons of the respective groups to communicate either supply or drain pressure thereto. Actuator locking port 213, which is blocked before the solenoid is activated, is adapted to communicate with the drain port 212 for reasons stated hereinafter. Each power valve is fluidly biased upwardly to an inactive position, wherein the chambers of the associated actuators are in communication with drain pressure.

The circuit which directs current through the solenoids comprises terminals 218 and 220 which are adapted to be connected to a D.C. (direct current) source of potential of any suitable design which is capable of generating a D.C. control signal pulse of sufficient power and duration to permit the power valves to function properly. The source must also be capable of reversing the polarity of the potential applied to the terminals to allow for rotor movement in either a clockwise or counterclockwise direction. As indicated in FIG. 4, the polarity of the terminals 218 and 220 for clockwise and counterclockwise rotor movement is respectively minus-plus and plus-minus.

Three magnetosensitive switches 222, 224 and 226 are fixedly positioned in the stator of the stepping motor at 30° intervals. The switches may be SPDT reed switches, magnetosensitive semiconductors, or other suitable types. The switches 222, 224 and 226 include repsective terminals (222a, 222b), (224a, 224b) and (226a, 226b). The switch terminals designated by the suffix "a" are connected to terminal 218 and the terminals designated by the suffix "b" are connected to terminal 220.

As will be observed from FIG. 4 the terminals $T_1$ of the power valves 200, 202 and 204 are connected to the switches 222, 224 and 266 respectively, such that when a switch is closed, due to its being positioned adjacent a magnet in the rotor 10, terminal 218 is connected to terminal $T_1$ of the switch's associated power valve, and when a switch is open, due to its being positioned adjacent a neutral sector of the rotor, terminal 220 is connected to the terminal $T_1$ of the switch's associated power valve. In the illustrated rotor position, switches 224 and 226 are closed and switch 222 is open.

Junction terminals 230, 232 and 234, disposed between the switches and the respective terminals $T_1$ of the power valves, are connected to the respective terminals $T_2$ through unilaterally conducting diodes 236, 238 and 240, which form an integral part of the logic circuit. Also, shunt diodes 242, 244 and 246 are connected across the respective solenoids to dissipate the energy stored in the field around the solenoid when the signal pulse terminates.

Turning now to FIG. 5, wherein only the hydraulic circuit for locking the rotor and providing a bias torque is shown, the shafts 250 of the pistons 207 are respectively fixedly secured to the solenoid actuated valves for movement therewith. A hydraulic line 252 connected to pressure line 22e serves to direct hydraulic fluid to and from cylinder 254 of power valve 200 in which piston 207 is slideably mounted for forceably extending the piston against the hydraulic bias which opposes a downward piston movement. Hydraulic line 256, which communicates with locking port 213 of power valve 200, embodies two check valves 256a and 256b to allow only flow towards port 213 of power valve 200. Hydraulic line 256 is also connected to the pressure lines 23e and 24e and cylinders 254 of power valves 202 and 204. Hydraulic line 258, which also embodies two check valves 258a and 258b, is connected to pressure line 22e and communicates with locking port 213 of power valve 202 intermediate the check valves thereof. Hydraulic line 258 is also connected to hydraulic line 256 intermediate the latter line's connection with pressure line 24e and check valve 256 a. Hydraulic line 260, which also has two check valves 260a and 260b, connects with pressure line 23e and communicates with locking port 213 of power valve 204. Hydraulic line 260 is connected at its end to hydraulic line 258 at a location intermediate pressure line 22e and check valve 258a.

Shaft assemblies 262, disposed in the lower parts of the power valves function like springs to respectively bias the valves to the positions illustrated for power valves 200 and 204. The cylinders of these shaft assemblies respectively communicate with pressure supply line 208 by means of suitable conduits shown by dashed lines. Piston assemblies 207, in contrast to the shaft assemblies 262, only communicate with supply pressure when supply pressure is directed to their associated actuators. Piston assembly 207 is sized to exert a downward force larger than the upward force exerted by shaft assembly 262 so that the particular valve will remain positioned as shown in power valve 202 after the D.C. pulse terminates. Thus, a hydraulic lock is provided for the rotor assembly due to supply pressure being directed to the group of actuators whose shafts lie along the respective lines 18.

A preferred construction for the power valves 200, 202, and 204, symbolically illustrated in FIGS. 4 and 5, is shown in FIG. 6. Each of the power valves comprises a housing 264 having a cylindrical chamber 265 therein in which a spool 266, with three spaced lands 268, 270 and 272, is disposed for axial sliding movement. The spool is movable between an upper limit of travel, in which the outboard face of land 272 is coincident with phantom line 274, and a lower limit of travel, in which the outboard face of land 268 is coincident with phantom line 276. An axial passageway 278 extends through spool 266 and communicates with four transverse passages at each end of the spool to enable fluid trapped at the ends of the chamber by lands 268 and 272 to be displaced during upward and downward movements of the spool and thereby permit untrammeled sliding of the spool. The armature 206A of the solenoid 206 is adapted to drive the spool downwardly when a signal is applied to terminals $T_1$ and $T_2$ by virtue of a shaft 282 which contacts the upper end of the spool. If the spool of valve 200 is in its lower position and a pulse is applied to the terminals of either power valve 202 or 204, the spool of valve 200 is urged upwardly by shaft assembly 262 as cylinder 254 is placed in communication with drain pressure as is hereinafter described. It should be noted that the upward urging on spool 266 is caused entirely by the supply pressure acting on the lower end of shaft assembly 262, the pressure being contained within chamber 284 by seal 286. The reason for not employing a spring to provide upward bias is that a spring would move the spool from the lower limit position to the upper limit position if supply pressure were to decrease and this would not permit a subsequently increased supply pressure to be directed to the associated actuators. In the instant arrangement, should supply pressure be lost during stroking of a group of actuators, when pressure returns these actuators will continue their previously interrupted strokes. Also, this feature assures restoration of the hydraulic rotor lock upon resumption of the supply pressure, should the rotor be in a locked position when supply pressure decreases.

For purposes of describing the manner of operation of the latter embodiment, assume that a voltage is applied to the terminals 218 and 220 in order to initate a counterclockwise step movement of the rotor 10. The applied voltage results in a potential difference between junction terminals 232 and 234 which induces a current in the solenoid of power valve 204, thereby driving the spool 266 thereof downwardly. Although a potential difference exists between junction terminals 230 and 234, the diode 236 prevents any significant current from flowing through the solenoid of power valve 200. No current will flow through the solenoid of power valve 202 since junction terminals 230 and 232 are referenced to the same potential. The result produced by this pulse is consequently a downward displacement of the spool of power valve 204.

The resulting effect of this downward displacement is communication between port 210 and port 216 and communication between port 213 and port 212 (note that the symbolical port 212 of FIG. 4 is in reality two ports as shown in FIG. 6, both of which communicate with tank 214). Hence, supply pressure is simultaneously directed to the actuators of group III and the piston assembly 207 of power valve 204. The pressure directed to the piston assembly of the power valve 204 holds the spool thereof in its lower limit of travel to maintain communication between ports 213 and 212 and between ports 210 and 216 of power valve 204 until another pulse is applied to terminals 218 and 220. Also, when the spool of power valve 204 is in its lower limit of travel, the actuators of group II and the piston assembly 207 of power valve 202 communicate with tank pressure via hydraulic line 260, check valve 260b, and port 213. This allows the shaft assembly of power valve 202 to move the spool to its upper limit of travel. When the spool of power valve 202 reaches its upper limit of travel, the actuators of group II are connected through port 216 to tank 214 and pressure is generated in pressure line 24e to actuator group III.

The hydraulic circuit of FIG. 5 precludes supply pressure from being applied to any actuator group until the actuator group, which is in current communication with supply pressure, is vented. When the spool of power valve 204 reaches its lower limit of travel, supply pressure from the port 210 thereof will be vented to the tank 214 of power valve 202 via hydraulic line 256, check valve 258b, port 213 of power valve 202 and port 212 of power valve 202. When the pressure in line 23e dissipates to such an extent that shaft assembly 262 of power valve 202 overcomes the force exerted by the opposing piston and moves the spool of power valve 202 upwardly, pressure will be applied to the actuators of group III. The circuit of FIG. 5 then renders it impossible to pressurize a group of actuators until the spool of the power valve associated with the pressurized actuators is displaced upwardly.

This applied pulse, of course, has no affect on power valve 200 except for the fact that the piston assembly 207 and actuator group I thereof are placed in communication with tank pressure via hydraulic line 258, hydraulic line 260, check valve 260a and port 213 of power valve 204, whereas, prior to the pulse, it will be noted that the actuators of group I and the piston assembly of power valve 200 were in communication with tank pressure via hydraulic line 258, check valve 258a, and port 213 of power valve 202. Before and after the pulse the actuators of group I and the piston assembly of power valve 200 also communicate with tank pressure via port 216 of power valve 200.

Therefore, the applied pulse causes the actuators of group III to stroke, thereby rotating the rotor in a counterclockwise direction through a 15° step.

After the rotation of rotor 10 is completed, a feedback signal is directed to the logic circuit via switches 222 and 226 which are now respectively connected to terminals 218 and 220, the switch 224 remaining connected to terminal 218 since it is adjacent another magnet on rotor 10. When the next counterclockwise pulse is applied to terminals 218 and 220 the solenoid of power valve 202 will be activated. It will be seen that the sequence of actuation of the power valves of FIG. 4 for counterclockwise rotation is: 204, 202, 200, 204, 202, 200; while for clockwise rotation the sequence is: 200, 202, 204, 200, 202, 204, 200.

Obviously, many modifications and variations of the present invention are possible in the light of the above teachings. It is therefore to be understood that within the scope of the appended claims the invention may be practices otherwise than as specifically described.

What We Claim Is:

1. A fluid operated stepping motor comprising:
a source of supply pressure;
a source of drain pressure;
an output member, having a cyclic edge profile, bidirectionally movable between a plurality of discrete positions;
three fluid operated actuators arranged adjacent the output member for advancing the output member by successive engagement with the profile thereof, each actuator having a fully extended position and a retracted position, a selected actuator being in the fully extended position and the other actuators being in retracted positions in the discrete positions of the output member;
power valve means to connect the actuators to the sources of supply pressure and drain pressure;
logic means adapted to receive bi-directional, digital, command signal pulses to control the power valve means such that supply pressure is directed to the selected actuator while drain pressure is directed to the other actuators and such that supply pressure is continuously directed to the selected actuator after termination of the signal pulse to drive the output member to a discrete position and provide a positive position lock thereafter;
means to communicate the signal pulses to the logic means; and
a discrete feedback control operatively connected to the logic means for generating a feedback signal thereto as the output member assumes a discrete position such that an actuator different from the previously selected actuator is advanced from the retracted position to the extended position by a succeeding signal pulse to drive the output member to an adjacent discrete position.

2. A fluid operated stepping motor, as defined in claim 1, wherein the feedback control comprises:
a plurality of permanent magnets mounted on the output member; and
a plurality of magnetosensitive switches positioned adjacent the output member and actuable thereby.

3. A fluid operated stepping motor, as defined in claim 1, wherein said feedback control comprises:
a plurality of sequencing conduits connected to the actuators for generating fluid feedback signals to the logic circuit.

4. A fluid operated stepping motor, as defined in claim 1, wherein the output member comprises an output shaft carrying a rotor.

5. A fluid operated stepping motor, as defined in claim 1, further including:
bias means, operable upon an increase in supply pressure after a depletion thereof, to drive the output member from a position intermediate two adjacent discrete positions to a discrete position so that proper sequencing of the actuators may be affected by a subsequent signal pulse.

6. A fluid operated stepping motor comprising:
a source of supply pressure;
a source of drain pressure;
a rotor, having a cyclic edge profile, bi-directionally movable between a plurality of discrete positions;
three groups of fluid operated actuators arranged adjacent the output member for successively advancing the output member by engagement with the profile thereof, each group comprising a plurality of actuators positionable in unison between corresponding positions, each actuator having a fully extended position and a retracted position, the actuators of a selected group being in extended positions and the actuators of the other groups being in retracted positions in the discrete positions of the rotor;
power valve means to connect the groups to the sources of supply pressure and drain pressure;
logic means adapted to receive bi-directional, digital, command signal pulses to control the power valve means such that supply pressure is directed to the selected group while drain pressure is directed to the other groups and such that supply pressure is continuously directed to the selected group after termination of the signal pulse to drive the rotor to a discrete position and provide a positive position lock thereafter;
means to communicate the signal pulses to the logic means; and
a discrete feedback control operatively connected to the logic means for generating a feedback signal thereto as the rotor assumes a discrete position such that the actuators of a group different from the previously selected group are advanced from the retracted positions to the extended positions by a succeeding signal pulse to drive the rotor to an adjacent discrete position.

7. A fluid operated stepping motor, as defined in claim 6, wherein the feedback control comprises:
a plurality of permanent magnets mounted on the output member; and
a plurality of magnetosensitive switches positioned adjacent the output member and actuable thereby.

8. A fluid operated stepping motor, as defined in claim 6, wherein the feedback control comprises:
   a plurality of sequencing conduits connected to the actuators for generating fluid feedback signals to the logic circuit.

9. A fluid operated stepping motor, as defined in claim 6, wherein both sides of the rotor have a cyclic edge profile and wherein half of the actuators are arranged on one side of the rotor and half of the actuators are arranged on the other side of the rotor such that each actuator is parallel to the shaft and in axial alignment with another actuator of the same group.

10. A fluid operated stepping motor comprising:
   a rotor having a plurality of pairs of converging ramps formed on at least one side thereof;
   a plurality of actuators positioned adjacent the rotor parallel to the axis of the rotor for selectively engaging the ramps to rotate the rotor;
   a logic circuit operatively connected to the actuators for selectively directing pressurized fluid thereto;
   a discrete feedback control operatively connected to the logic circuit for generating a feedback signal thereto representative of a discrete position of the rotor; and the feedback control comprising:
   a plurality of permanent magnets mounted on the rotor; and
   a plurality of magnetosensitive switches positioned adjacent the rotor and actuable thereby.

11. A fluid operated stepping motor comprising:
   a rotor having a plurality of pairs of converging ramps formed on at least one side thereof;
   a plurality of actuators positioned adjacent the rotor parallel to the axis of the rotor;
   a logic circuit operatively connected to the actuators for selectively directing pressurized fluid thereto;
   a discrete feedback control operatively connected to the logic circuit for generating a feedback signal thereto representative of a discrete position of the rotor; and the feedback control comprising:
   a plurality of sequencing conduits connected to the actuators for generating fluid feedback signals.

* * * * *